United States Patent
Sotelo et al.

(10) Patent No.: US 9,690,777 B1
(45) Date of Patent: Jun. 27, 2017

(54) TRANSLATING WEBSITE LISTINGS AND PROPAGATING THE TRANSLATED LISTINGS TO LISTING WEBSITES IN OTHER REGIONS

(71) Applicant: Webinterpret, Sophia Antipolis (FR)

(72) Inventors: Susana Sotelo, Santiago de Compostela (ES); Diego Bartolome, Sabadell (ES); Pawel Jankiewicz, Warsaw (PL); Patrick Smarzynski, Warsaw (PL); Benjamin Cohen, Warsaw (PL); Marek Kostykowski, Warsaw (PL); Joanna Chodzynska, Warsaw (PL)

(73) Assignee: Webinterpret, Sophia Antipolis (FR)

( * ) Notice: Subject to any disclaimer, the term of this patent is extended or adjusted under 35 U.S.C. 154(b) by 0 days.

(21) Appl. No.: 14/965,803

(22) Filed: Dec. 10, 2015

(51) Int. Cl.
  *G06F 17/28* (2006.01)
  *G06F 17/30* (2006.01)
  *G06F 17/27* (2006.01)

(52) U.S. Cl.
  CPC ........ *G06F 17/2836* (2013.01); *G06F 17/274* (2013.01); *G06F 17/289* (2013.01); *G06F 17/30864* (2013.01)

(58) Field of Classification Search
  None
  See application file for complete search history.

(56) References Cited

U.S. PATENT DOCUMENTS

| | | | | |
|---|---|---|---|---|
| 5,140,522 A * | 8/1992 | Ito | ...... | G06F 17/2755 704/2 |
| 6,219,632 B1 * | 4/2001 | Schumacher | ...... | G06F 17/279 704/2 |
| 7,353,165 B2 * | 4/2008 | Zhou | ...... | G06F 17/2827 704/2 |
| 7,711,571 B2 * | 5/2010 | Heiner | ...... | H04W 4/02 704/1 |
| 8,050,906 B1 * | 11/2011 | Zimmerman | ...... | G06F 17/2836 704/2 |
| 8,504,353 B2 * | 8/2013 | Zaslavskiy | ...... | G06F 17/2818 704/2 |
| 8,812,291 B2 * | 8/2014 | Brants | ...... | G06F 17/2818 370/270 |
| 9,418,060 B1 * | 8/2016 | Winham | ...... | G06F 17/2854 |
| 2003/0004702 A1 * | 1/2003 | Higinbotham | ...... | G06F 17/2836 704/2 |
| 2003/0120560 A1 * | 6/2003 | Almeida | ...... | G06Q 30/06 705/26.5 |
| 2004/0049374 A1 * | 3/2004 | Breslau | ...... | G06F 17/2872 704/2 |
| 2004/0237044 A1 * | 11/2004 | Travieso | ...... | G06F 17/289 715/202 |

(Continued)

*Primary Examiner* — Jialong He
(74) *Attorney, Agent, or Firm* — Elliot H. Karlin; Hickman Palermo Becker Bingham LLP

(57) ABSTRACT

A method and system for translating and propagating listings amongst listing websites is provided. In an embodiment, a request is received to propagate listings from a first listing website. Application server interface instructions are executed to make calls to APIs of a first listing website server for one or more listings. One or more listings in a first language are received from the first listing website and translated into one or more second languages. The translations are then used to generate one or more second listings for one or more second listing websites.

26 Claims, 6 Drawing Sheets

(56) References Cited

U.S. PATENT DOCUMENTS

| | | | |
|---|---|---|---|
| 2006/0200766 A1* | 9/2006 | Lakritz | G06F 15/00 715/234 |
| 2008/0059573 A1* | 3/2008 | Almeida | G06F 17/30873 709/203 |
| 2008/0189257 A1* | 8/2008 | Wiseman | G06F 17/30669 |
| 2009/0138379 A1* | 5/2009 | Scheman | G06Q 30/0601 705/26.1 |
| 2010/0169764 A1* | 7/2010 | Travieso | G06F 17/289 715/239 |
| 2012/0109786 A1* | 5/2012 | Platek | G06Q 30/06 705/27.1 |
| 2014/0372099 A1* | 12/2014 | Ronin | G06F 17/289 704/2 |
| 2015/0134319 A1* | 5/2015 | Chelly | G06Q 30/0601 704/2 |

* cited by examiner

FIG. 4

Size 6 Search: No Match
| RICK | AND | MORTY | KEY | CHAIN | FLASK |

Size 5 Search: No Match
| RICK | AND | MORTY | KEY | CHAIN | FLASK |

Size 4 Search: No Match
| RICK | AND | MORTY | KEY | CHAIN | FLASK |

Size 3 Search: 1 Match - Rick and Morty
| RICK | AND | MORTY | KEY | CHAIN | FLASK |

Size 2 Search: 1 Match - Key Chain
| RICK | AND | MORTY | KEY | CHAIN | FLASK |

TRANSLATING WEBSITE LISTINGS AND PROPAGATING THE TRANSLATED LISTINGS TO LISTING WEBSITES IN OTHER REGIONS

FIELD OF THE DISCLOSURE

The present disclosure relates to computers that are programmed or configured to retrieve listings through application programming interfaces of listing website servers, translate the listings into one or more other languages, and propagate the listings to other listing website servers in other regions. Embodiments have applicability, for example, to online auction or retailer listings in multiple languages.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today physical and digital items are sold frequently over the internet and online retailers and auction sites have become leading channels for offer and sale. Various retailers may retain websites from which items can be purchased. When a user purchases an item over the internet, a payment is sent to the retailer and the item is either digitally provided to the user or physically shipped to an address of the user. By providing an opportunity for a user to purchase an item over the internet, a retailer is able to reach a broader audience with a particular product.

While many retailers maintain websites for electronic commerce, some retailers are unable to maintain websites for selling goods. Even retailers that maintain websites may have trouble reaching a broad audience with the goods sold on the retailer websites. To solve this problem, listing websites such as AMAZON and EBAY were created to aggregate listings in various categories and act as an intermediary between the seller and the purchaser. Listing websites allow a seller to identify a product for sale. A purchaser may search through products presented by different sellers and select a particular product for purchase. In this manner, purchasers may view a wide array of products from different sellers and a retailer may reach an audience that would have been previously unavailable.

A difficulty arises for a retailer who wishes to coordinate listings between multiple websites. As listing websites become more popular and increase in number, a retailer may wish to sell a product on various listing websites in order to reach a larger audience. As each listing website differs in how a listing is created and stored, selling a product on multiple listing websites requires a retailer to generate different listings for each listing website and update each listing every time one of the listings changes.

An added difficulty arises for a retailer who wishes to sell an item internationally with a listing readable in local languages. Listing websites are generally geographically located in one region. For example, AMAZON has separate retail websites for United States, United Kingdom, Ireland, France, Canada, Germany, Italy, Spain, the Netherlands, Australia, Brazil, Japan, China, India, and Mexico. Thus, if a retailer wishes to sell an item internationally, the retailer would have to translate each listing into at least French, German, Italian, Spanish, Japanese, Chinese, and Hindi and create separate listings for each version of the website.

Additionally, if the retailer wished to sell a listing internationally using multiple listing websites for each location, each listing would need to be produced in accordance with the listing requirements for each listing website in each location.

Thus, there is a need for a system that solves the internet based problem of generating listings for multiple types of listing websites and multiple versions of listing websites in multiple languages.

SUMMARY

The appended claims may serve as a summary of the disclosure.

BRIEF DESCRIPTION OF THE DRAWINGS

In the drawings:

FIG. 4 depicts a method of translating a series of words in a field using n-gram identification.

DETAILED DESCRIPTION

Figure 1:
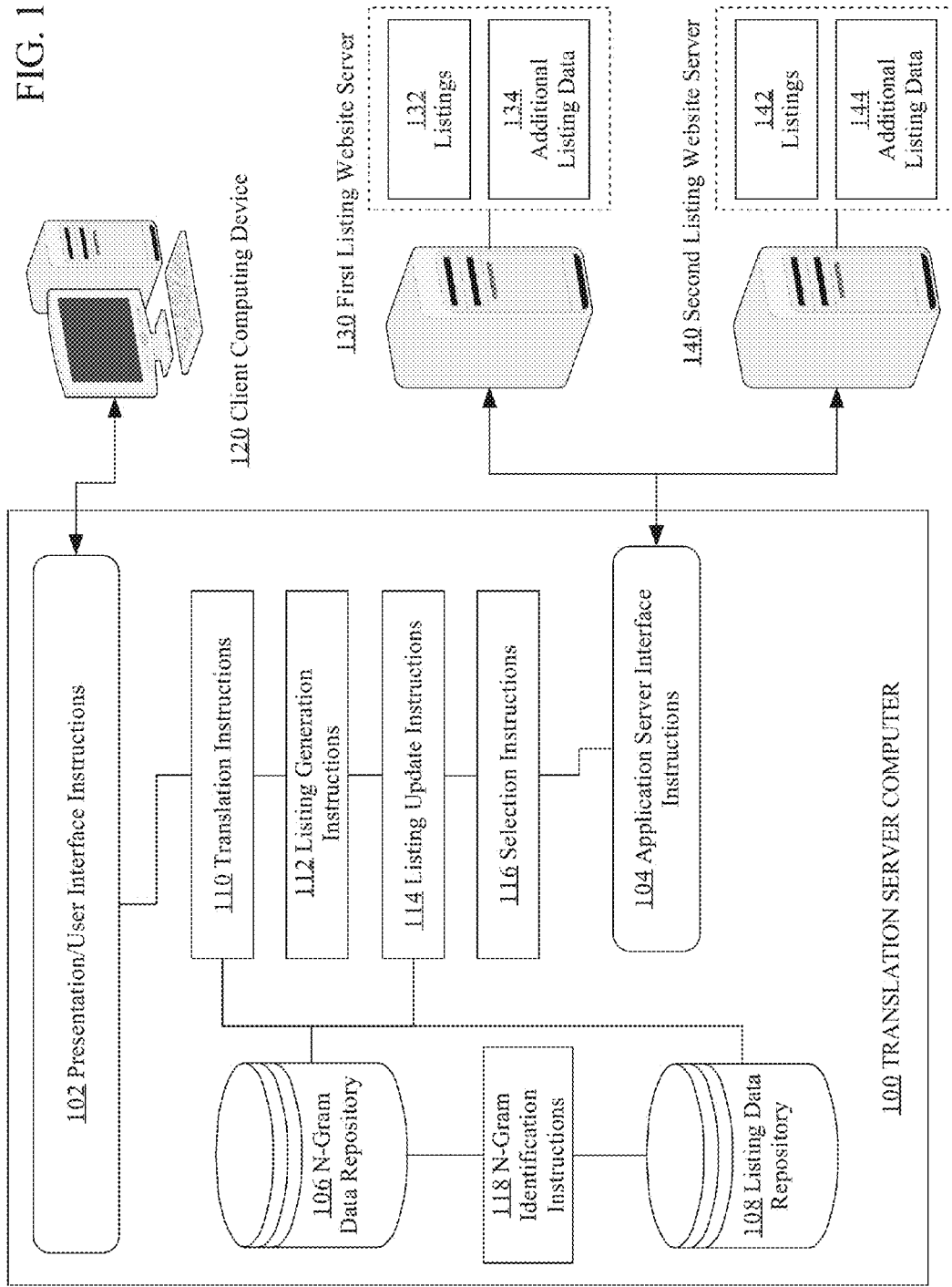
FIG. 1 depicts an example computer system that is configured or programmed to receive listings from one or more first listing website servers, translate the listings into one or more other languages, and send the translated listings to one or more second listing website servers.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

General Overview
Structural Overview
Accessing Listings
Translating Listings Using an N-Gram Data Repository
Adding to the N-Gram Data Repository
Translating Listings Using a Listing Data Repository
Translation Fields
Listing Generation
Addressing Listing Limitations
Additional Fields
Market Selection
Listing Selection
Listings from Multiple Locations
Updating Listings
Dynamic Pricing
Implementation Example—Hardware Overview

GENERAL OVERVIEW

Aspects of the disclosure generally relate to computer-implemented techniques for translating listings. In an embodiment, a translation server computer receives a request to propagate listings from a first website in one language to one or more second websites in one or more second languages. The translation server computer may also receive authorization through a script key or authorization token in order to access the listings. The translation server computer makes calls to the application programming interfaces (APIs) of the one or more second websites to receive the listings. The translation server computer then executes translation instructions to translate the listing into the one or more second languages. The translation server computer then executes listing generation instructions to generate listings for each of the one or more second websites using the translated listing. Generating the listings for the second websites may comprise identifying requirements of the second listing websites and modifying the translated listing to meet the requirements. In an embodiment, the translation server computer selects optimal listings for translation and/or optimal second listing websites in which to propagate the listings. The translation server computer may also be configured to send updates to each of the listing websites in response to identifying a change in any of the listings.

In an embodiment, a method comprises using user interface instructions programmed in a translation server computer, receiving a request from a client computing device to provide translated copies of one or more first listings, which are hosted at one or more first listing website servers and expressed in a first language and associated with the client computing device, to one or more second listing website servers, using one or more second languages; using application server interface instructions programmed in the translation server computer, making one or more calls to an application programming interface of the first listing website server for the one or more first listings; using the application server interface instructions of the translation server computer, receiving, from the first listing website server, the one or more first listings and additional listing data of the one or more first listings and storing the one or more first listings and the additional listing data in memory of the translation server computer; using translation instructions of the translation server computer, translating the one or more first listings from the first language into translated listings that use the one or more second languages; using listing generation instructions of the translation server computer, generating one or more second listings from the translated listings; using the application server interface instructions of the translation server computer, sending the one or more second listings to the one or more second listing website servers.

Other features and aspects of the disclosure will become apparent in the drawings, description, and the claims.

Structural Overview

FIG. 1 depicts an example computer system that is configured or programmed to receive listings from one or more first listing website servers, translate the listings into one or more other languages, and send the translated listings to one or more second listing website servers.

In an embodiment, translation server computer 100 is programmed with or contains presentation/user interface instructions 102, application server interface instructions 104, n-gram data repository 106, listing data repository 108, translation instructions 110, listing generation instructions 112, listing update instructions 114, selection instructions 116, and n-gram identification instructions 118. "Instructions," as used in FIG. 1, refers to digitally programmed logic in main memory in translation server computer 100 which are configured, when executed by one or more processors, to cause the computer to perform the functions that are described herein for that logical element. For example, translation instructions when executed cause performing the translation functions that are further described herein. These elements of FIG. 1 also indirectly indicate how a typical programmer or software engineer would organize the source code of programs that implement the functions that are described; the code may be organized into logical modules, methods, subroutines, branches, or other units using an architecture corresponding to FIG. 1. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text.

Translation server computer 100 may also include other devices, components, or elements of a computer system such as volatile or non-volatile memory, non-volatile storage, such as disk, and I/O devices or interfaces.

Client computing device 120 may be any of a laptop, netbook, personal computer, workstation, smartphone, tablet, PDA, or other computing devices associated with a customer of translation server computer 100. First listing website server 130 and second listing website server 140 may each be a server-class computer or multiple computers in a data center. Each of first listing website server 130 and second listing website server 140 may contain one or more listings and additional listing data. In an embodiment, a listing is a data record that includes a plurality of data values, such as a title, a description, an available quantity, and a price. In an embodiment, additional listing data comprises data associated with one or more listings that is not part of the listing itself. For example, additional listing data may include data relating to past transactions of one or more listings, such as items purchased, dates of purchases, and purchaser data. Additional listing data may also include information about the listing itself, such as a category identification. Translation server computer 100 may be communicatively coupled directly or indirectly via one or more networks, such as local area networks or wide area networks, or internetworks with client computing device 120, first listing website server 130, and second listing website server 140.

In an embodiment, presentation/user interface instructions 102, when executed by one or more processors, cause translation server computer 100 to send data to and receive data from client computing device 120 over one or more networks. Presentation/user interface instructions 102 may also cause translation server computer 100 to provide a graphical user interface to client computing device 120 in the form of static or dynamic HTML pages that are delivered to and rendered by a browser on client computing device 120. Additionally and/or alternatively, client computing device 120 may host a locally installed client application that interacts with a presentation layer of a server application system hosted at translation server computer 100. The graphical user interface may provide controls for identifying listings, authorizing translation server computer 100 to access the listings, identifying one or more other listing websites, and establishing rules for listing translation, generation, and/or selection.

In an embodiment, application server interface instructions 104, when executed by one or more processors, cause translation server computer 100 to communicate over a network with first listing website server 130 and second listing website server 140. For example, translation server computer 100 may be programmed or configured to make calls to the application program interfaces (APIs) of web services applications hosted by first listing website server 130 and second listing website server 140. Application server interface instructions 104 may be further configured to cause translation server computer 100 to receive listings and additional listing data and to store the listings and additional listing data in listing data repository 108.

N-gram data repository 106 may be programmed or configured to digitally store records representing a plurality of n-grams and corresponding translations for each of the n-grams. An n-gram is a sequence of words that have been identified to comprise a single logical unit. For example, the words "house of cards" may be identified as a three-gram, three words that comprise a single logical unit. In an embodiment, n-grams include uni-grams, single words that are identified to generally comprise a single logical unit. For example, "Batman" may be identified as a uni-gram. Each n-gram may be stored in n-gram data repository 106 with a corresponding translation for the n-gram in one or more languages.

Listing data repository 108 may be programmed or configured to digitally store records representing listings received from first listing website server 130 and translated listings sent to second listing website server 140. Listing data repository 108 may also be programmed or configured to digitally store records representing additional listing data. In an embodiment, a portion of the additional listing data is stored with corresponding listings. For example, a first data record may include an identification of a listing, listing details, such as price, quantity, title, and description, and other related information, such as sales data relating to the listing.

Listings and n-grams may be stored in data structures in memory, rows in a database table, in flat files or spreadsheets, or other forms of stored digital data. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In an embodiment, translation instructions 110, when executed by one or more processors, cause translation server computer 100 to translate all or a portion of a listing into one or more other languages. For example, translation server computer 100 may execute translation instructions 110 to identify n-grams in the listing, replace the n-grams with translations, and perform translation post processing to correct translations. In an embodiment, translation instructions 110 dynamically update as translation server computer 100 receives additional information. For example, translation server computer 100 may utilize machine learning techniques to correct translation instructions 110 in response to receiving data from an administrator indicating that one or more translated listings contained incorrect translations.

In an embodiment, listing generation instructions 112, when executed by one or more processors, cause translation server computer 100 to generate one or more listings from the translations created by executing translation instructions 110. Generating the one or more listings may comprise identifying fields in the translated listings, identifying corresponding available fields used by second listing website server 140, and inputting the translated data from the translated listings into the corresponding available fields. Generating the one or more listings may comprise identifying fields in the translated listings that do not have corresponding available fields in the second listing website, extracting data from the fields in the translated listings, and placing the data in a different field used by second listing website server 140. Generating the one or more listings may also comprise identifying fields used by the second listing website server that do not correspond to fields from the translated listings, identifying data in the translated listings that correspond to the identified fields, and inputting the identified data into the identified fields.

In an embodiment, listing update instructions 114, when executed by one or more processors, cause translation server computer 100 to make changes to one or more listings based on received data. For example, in response to determining that data in one listing has changed, translation server computer 100 may identify all other versions of the listing on other listing websites and make changes to those listings by sending update requests to the APIs of the listing websites. Additionally, and/or alternatively, in response to identifying new n-grams, translation server computer 100 may execute listing update instructions 114 to identify listings that contain the newly identified n-grams and send updated translations to the listing website servers that contain the identified listings.

In an embodiment, selection instructions 116, when executed by one or more processors, cause translation server computer 100 to identify listings for translation, identify listings to be generated for specific listing websites, and/or identify websites to which to send translated listings. For example, selection instructions 116 may be configured to cause translation server computer 100 to identify optimal listings associated with a particular client computing device to either translate or prioritize in listing generation. Additionally and/or alternatively, selection instructions 116 may be configured to cause translation server computer 100 to identify optimal listing websites for each listing, such as by identifying optimal markets for a specific category of listing.

In an embodiment, n-gram identification instructions 118, when executed by one or more processors, cause translation server computer 100 to identify n-grams and store the identified n-grams in n-gram data repository. Translation server computer 100 may execute n-gram identification instructions 118 to search through a plurality of listings in order to find repeated sequences of words to identify as n-grams. If translation server computer 100 identifies a particular sequence of words that is found in multiple listings, translation server computer 100 may identify the particular sequence of words as an n-gram and may store the n-gram with a corresponding translation in n-gram data repository 106.

For purposes of illustrating a clear example, FIG. 1 shows a limited number of instances of certain functional elements. However, in other embodiments, there may be any number of such elements. For example, embodiments may use thousands or millions of different client computing devices or listing website servers. Further, first listing website server 130 and second listing website server 140 may be implemented using two or more processors, cores, clusters, or instances of physical machines or virtual machines, configured in a discrete location or co-located with other elements in a datacenter, shared computing facility or cloud computing facility.

In an embodiment, the implementations of the functions described herein for presentation/user interface instructions 102, application server interface instructions 104, n-gram data repository 106, listing data repository 108, translation instructions 110, listing generation instructions 112, listing update instructions 114, selection instructions 116, and n-gram identification instructions 118 using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve as algorithms, plans or directions that may be used to program a computer or logic to implement the functions that are described.

Accessing Listings

Figure 2:
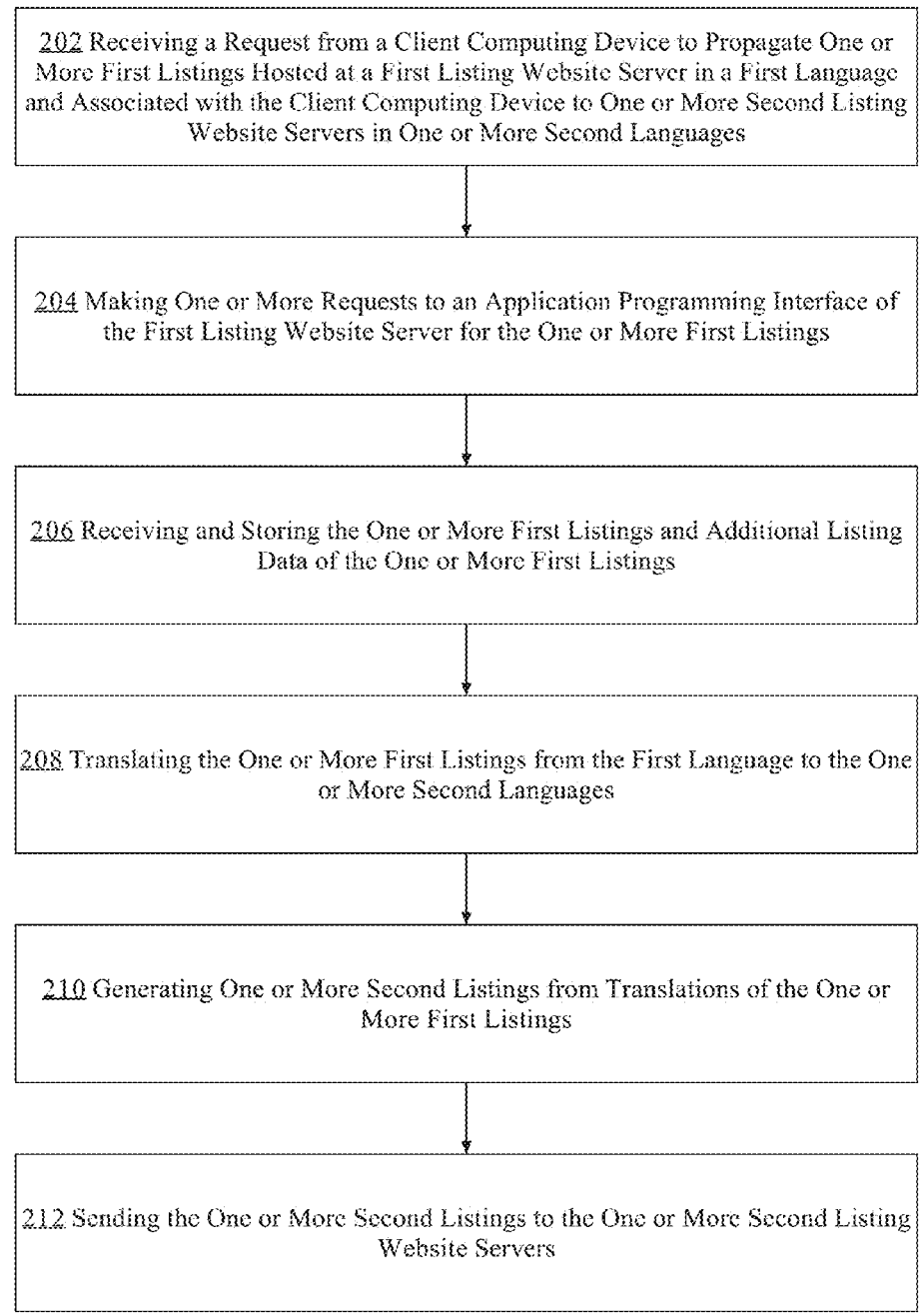
FIG. 2 depicts a method or programming algorithm for receiving one or more listings from one or more first listing website servers, translating the one or more listings into one or more other languages, and sending the translated listings to one or more second listing website servers.

FIG. 2 depicts a method or programming algorithm for receiving one or more listings from one or more first listing website servers, translating the one or more listings into one or more other languages, and sending the translated listings to one or more second listing website servers. FIG. 2, and each other method diagram or flow diagram in this disclosure, is intended to describe an algorithm, process or other outline for how the functions shown in the drawing figure may be implemented in programming instructions for a computer. Any suitable programming language or development environment may be used such as JAVA, OBJECTIVE-C, C++, scripting languages, and the like. In practice, an implementation or embodiment will include program instructions for many steps other than those shown in the drawing figures, but FIG. 2, and each other method diagram or flow diagram in this disclosure, nevertheless indicate the algorithmic information that the inventors have deemed sufficient to communicate to a skilled programmer or software engineer how to implement the specified functions in complete working code.

At step 202, a request is received from a client computing device to propagate one or more first listings hosted at a first listing website in a first language and associated with the client computing device to one or more second listing website servers in one or more second languages. Translation server computer 100 may cause display of a graphical user interface on client computing device 120 with controls for identifying a first listing website. The controls for identifying the first listing website may include a drop down menu for selecting a listing website. The controls may also include identification of the listings to be propagated. For example, a customer may wish to sell only select items internationally. Through the controls of the graphical user interface, the customer may select the listings for the select items to be propagated internationally.

In an embodiment, the graphical user interface contains additional controls for identifying one or more second listing websites. The graphical user interface may include a drop down menu for identifying a particular website or geographic region and a control for adding the particular website or geographic region to a list of locations to which the listing is propagated. For example, a user may select Italy and France from the drop down list in order to propagate the one or more listings to websites in Italy or France. Additionally and/or alternatively, translation server computer 100 may cause display of a drop down menu for selecting websites or geographic locations to which the customer does not wish to propagate the listings. For example, translation server computer 100 may default to translating each listing into languages corresponding to all of the second listing websites and propagating the translated listings to all of the second listing websites. If a customer is concerned about selling an item in a particular location, the customer may select the particular location to cause translation server computer 100 to not create listings for the particular location.

Translation server computer 100 may request authorization from client computing device 120 to access listings associated with client computing device 120. For example, a first listing website may use the user name and password of a customer to authenticate the customer. Instead of requesting the user name and password from the customer, translation server computer 100 may request a script key from the customer for each site where the customer maintains listings. The script key may be any means of conveying to the first listing website authorization for translation server computer 100 to access listings in a customer's account. As an example, a third party platform such as OAuth may be used to request and receive authorization from client computing device 120.

At step 204, one or more requests are made to the APIs of the first listing website server for the one or more listings. For example, translation server computer 100 may execute application server interface instructions 104 to make calls to the APIs of first listing website server 130 for listings 132 and additional listing data 134. Listings 132 may comprise all listings that correspond to authorization given to translation server computer 100 from client computing device 120 or only listings identified by client computing device 120 for propagation. Additional listing data 134 may comprise any additional data that translation server computer 100 is authorized to receive. For example, additional listing data 134 may include past transaction data for listings associated with client computing device 120. The past transaction data may include the items sold, the quantity sold, the location of the purchaser, the price at which the item was sold, and any other available data regarding a past transaction. Additional listing data 134 may also comprise other relevant data that does not require authorization to receive. For example, if a customer is selling designer sporks, translation server computer 100 may request data from first listing website server 130 regarding prior listings and prior sales activity associated with designer sporks.

At step 206, the one or more first listings and additional listing data of the one or more listings are received. Translation server computer 100 may store the received listings in listing data repository. In an embodiment, translation server computer 100 separates the listings into field names and field values. For example, a listing may be broken up into the title, the description, the price, the available quantity, and the category of the item. Some listings may also include additional fields, such as color and size, while such fields are absent in other listings. Translation server computer 100 may identify each field in the listing and store data describing the field and the field value. In an embodiment, translation server computer 100 stores the listings with additional information, such as the category of the listing, past sales of the listing, and sales data for other listings in the same category.

In an embodiment, upon receiving a listing from first listing website server 130, translation server computer 100 determines whether a translation for the listing is stored in listing data repository 108. In the case of non-unique items, translation server computer 100 may have already created or received a translation for a listing describing the item. For example, multiple retailers may market the same version of a RUBIK'S CUBE toy. Translation server computer 100 may search listing data repository 108 for a listing with the same title and description as the received listing. If translation server computer 100 identifies a listing with the same title and description as the received listing, translation server computer 100 may use the translations of the stored listing instead of translating the received listing.

In some embodiments, upon receiving a listing from first listing website server 130, translation server computer 100 determines whether a similar listing is stored in listing data repository 108. Translation server computer 100 may compare the received listing with listings stored in data repository in order to determine a degree of similarity. For example, a degree of similarity may refer to a percentage of matching words, characters, or n-grams. If a listing in the data repository contains more than a threshold degree of similarity, such as eighty percent matching words, translation server computer 100 may use the translations of the stored listing for the matching portions of the listing and perform translation techniques on the remaining words or phrases.

Translating Listings Using an N-Gram Data Repository

At step 208, one or more first listings are translated from a first language to one or more second languages. For example, translation server computer 100 may identify one or more second listing websites in which to propagate the one or more first listings. For each of the one or more second listing websites, translation server computer 100 may identify a language associated with the listing website. For example, a listing website that is displayed in Germany may be in German while a listing website displayed in Israel may be in Hebrew. Translation server computer 100 may execute translation instructions 110 to translate the one or more first listings from the first language to the one or more second languages corresponding to the one or more second listing websites.

In an embodiment, translation server computer 100 creates translations for the one or more first listings using n-gram data extracted from n-gram data repository 106. N-gram data repository may be programmed or configured to digitally store records representing a plurality of n-grams and corresponding translations for each of the n-grams. An n-gram is a sequence of words that have been identified to comprise a single logical unit. New n-grams may be added to n-gram data repository 106 using techniques described herein. In alternative embodiments, n-grams may be identified from prior listings using techniques described herein each time translation server computer 100 performs a translation.

Figure 3:
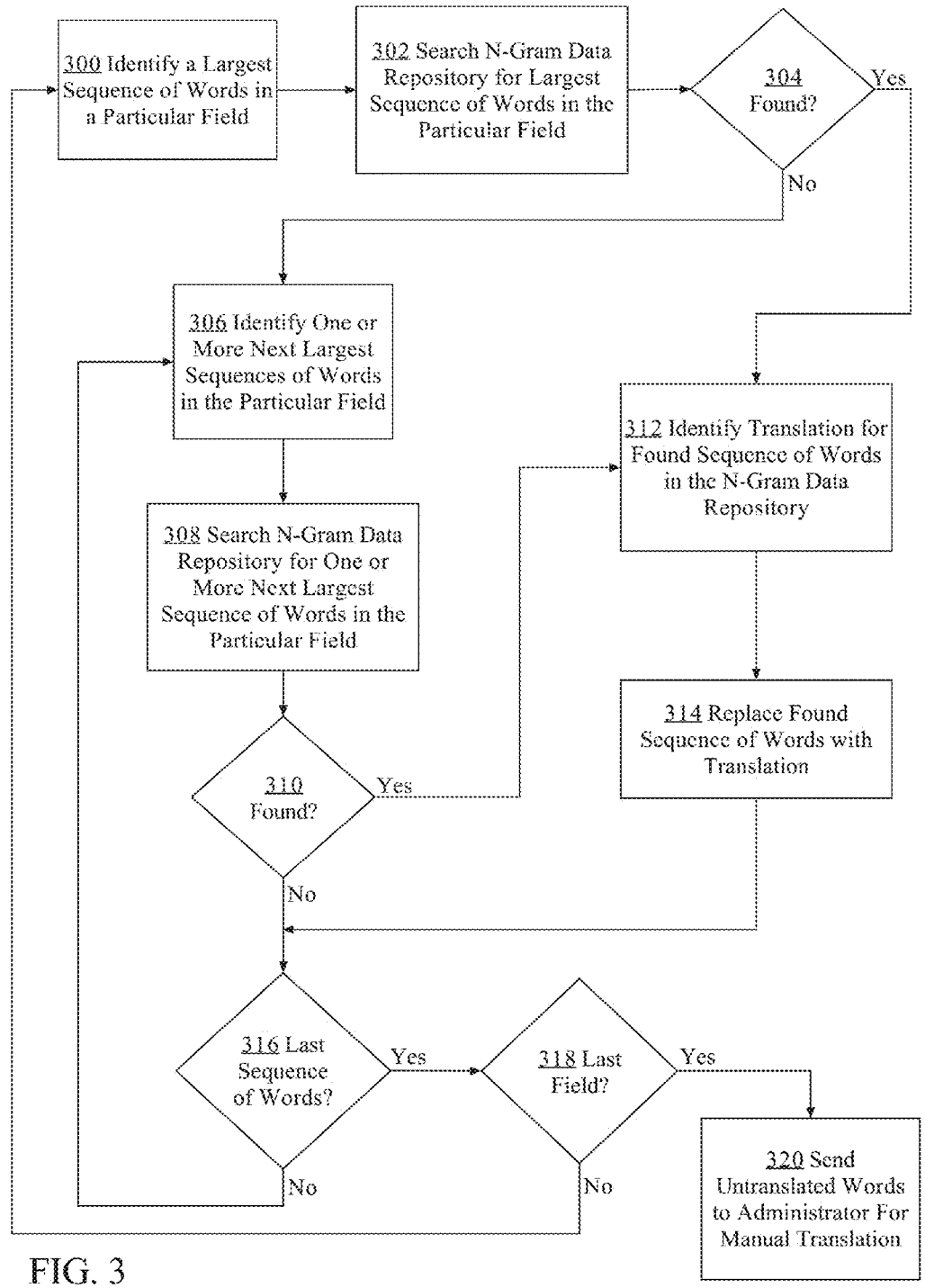
FIG. 3 depicts a method of translating one or more fields in a listing using an n-gram data repository.

FIG. 3 depicts a method of translating one or more fields in a listing using an n-gram data repository.

At step 300 a largest sequence of words in a particular field is identified. For example, translation server computer 100 may begin by translating the title field of a listing. The largest sequence of words in the title field may comprise all of the words in the title field. Additionally and/or alternatively, a break in the particular field, such as a comma, period, or carriage return, may signify to translation server computer 100 that words before the break should not be grouped together as a single n-gram with words after the break. Thus, in some embodiments, a field may contain multiple largest sequences of words. In such embodiments, translation server computer 100 may treat each section of the particular field as a separate field.

At step 302 an n-gram data repository is searched for the largest sequence of words in the particular field. In an embodiment, translation server computer 100 treats each sequence of words as a possible n-gram. Translation server computer 100 may search n-gram data repository 106 for a match of the largest sequence of words. At step 304, translation server computer 100 determines if the largest sequence of words from the first listing is in n-gram data repository. If the largest sequence of words is found in the n-gram data repository, translation server computer 100 may continue the method with step 314. If the largest sequence of words is not found in the n-gram data repository, translation server computer 100 may continue with step 306.

At step 306, if the largest sequence of words is not found in the n-gram data repository, one or more next largest sequences of words are identified in the particular field. For example, if the title of a listing was six words long, the one or more next largest sequence of words in the particular field may comprise the first five words of the listing and the second five words of the listing. As n-grams are a particular sequence of words, translation server computer 100 may not create n-grams using disconnected words. For example, if the title of the listing is six words long, translation server computer 100 may not make an n-gram out of the first word and the last four words as the break caused by the second word reduces the likelihood that the five words comprise a single logical unit.

At step 308, the n-gram data repository is searched for the one or more next largest sequence of words in the particular field. For example, after identifying multiple n-gram candidates, translation server computer 100 may search n-gram data repository 106 for each n-gram candidate. In an embodiment, if translation server computer 100 identifies an n-gram in n-gram data repository 106, translation server computer 100 does not search n-gram data repository for n-grams that contain any overlapping words with the identified n-gram. For example, the title "butterfly knife sharpener" may contain two overlapping n-grams, "butterfly knife" and "knife sharpener." If translation server computer 100 identified "butterfly knife" in n-gram data repository 106, translation server computer 100 may be programmed or configured to not search n-gram data repository 106 for "knife sharpener." In other embodiments, translation server computer 100 searches n-gram for each n-gram candidate. If multiple n-gram candidates are found in n-gram data repository 106, translation server computer 100 may determine a confidence level for each n-gram and use the n-gram with the highest confidence level. For example, a confidence level may include identifying a number of past occurrences of the n-gram in other listings or a percentage of past occurrences of the n-gram in other listings that include the same translation for the n-gram. The confidence level for each n-gram may be stored with the n-gram in n-gram data repository 106.

At step 310, translation server computer 100 determines whether any of the one or more next largest sequence of words was found in n-gram data repository 106. If any of the one or more next largest sequences of words is found in n-gram data repository 106, translation server computer 100 may continue the method with step 312. If the one or more next largest sequences of words are not found in n-gram data repository 106, translation server computer 100 may continue the method at step 316.

At step 312, after translation server computer 100 identifies a sequence of words from the particular field in the listing that can be matched to an n-gram in n-gram data repository 106, translation server computer 100 identifies a translation for the found sequence of words in n-gram data repository 106. Translation server computer 100 may identify a translation for the found sequence of words in the data repository for each language into which translation server computer 100 is programmed or configured to translate the particular listing. For example, if translation server computer 100 has received a request to propagate the listing in Germany and France, translation server computer 100 may identify translations for the identified n-gram in German and French. If a translation is not available in a particular language, translation server computer 100 may treat the n-gram as not found in n-gram data repository 106 for the purposes of generating a listing in the particular language. In some embodiments, translation server computer 100 may treat the n-gram as found for the purposes of identifying other n-grams, but send the identified n-gram to an administrator for manual translation. For example, if "butterfly knife" contains a translation in n-gram data repository in German but not in French, translation server computer 100 may identify "butterfly knife" as an n-gram requiring translation into French and translate the word "sharpener" into French separately.

At step 314, for each language in which a listing is to be generated, translation server computer 100 replaces the found sequence of words with a translation of the found sequence of words in the language. For example, translation server computer 100 may replace "Butterfly Knife" with the German translation "Schmetterlingsmesser" for the German listing. In an embodiment, phrases that have been translated are removed from the listing for the purposes of translating the remaining n-grams. For example, in the above example, the phrase "Butterfly Knife Sharpener" may be replaced with "Schmetterlingsmesser Sharpener" with "Schmetterlingsmesser" identified as having already been translated.

At step 316, translation server computer 100 determines whether the one or more sequences of words searched are the last sequences of words in the particular field. If any sequences of words remain for translation, translation server computer 100 may continue the method with step 306. At step 306, translation server computer 100 may identify the next largest sequence of words after the prior translation. In this way, translation server computer 100 translates the words in the particular field by searching for increasingly smaller phrases until translation server computer 100 determines that no more words or phrases are available for translation.

For example, FIG. 4 depicts a method of translating a series of words in a field using n-gram identification. In FIG. 4, the phrase "Rick and Morty Key Chain Flask" is translated using the method depicted in FIG. 3. Translation server computer 100 begins by searching n-gram data repository 106 for the largest sequence of words, "Rick and Morty Key Chain Flask." After failing to identify the largest sequence of words as a single n-gram in n-gram data repository 106, translation server computer 100 identifies "Rick and Morty Key Chain" and "and Morty Key Chain Flask" as the next possible n-grams. After failing to identify any 5-grams from the title in n-gram data repository 106, translation server computer 100 identifies "Rick and Morty Key," "and Morty Key Chain," and "Morty Key Chain Flask" as possible n-grams. After failing to identify any of the 4-grams in n-gram data repository 106, translation server computer 100 performs a 3-gram search. Upon locating the 3-gram "Rick and Morty" in n-gram data repository 106 without locating any of the remaining 3-grams, translation server computer 100 may proceed by identifying 2-grams in the remaining words. In the example depicted in FIG. 4, translation server computer 100 identified "Rick and Morty" as a first n-gram and "key chain" as a second n-gram.

In some embodiments, n-gram data repository contains uni-grams, or single word n-grams, with corresponding translations. In other embodiments, n-gram data repository 106 only contains n-grams with a plurality of words. In embodiments where n-gram data repository 106 contains uni-grams, step 316 may comprise determining whether the entire field has been matched or whether the last search performed was a search for uni-grams. For example, in FIG. 4, after identifying the first two n-grams, translation server computer 100 may determine that a single word, "flask," remains in the listing and continue the method by repeating step 306 and searching n-gram data repository 106 for the word "flask." In embodiments where n-gram data repository does not contain uni-grams, translation server computer 100 may determine whether any sequences of words comprising two or more words remain in the particular field. For example, in FIG. 4, after identifying the first two n-grams, translation server computer 100 may determine that no sequences of two or more words remain and continue the method with step 318.

At step 318, translation server computer 100 determines if the particular field is the last field in the listing. For example, a listing may contain a title field and a description field. After translating the words in the title field, translation server computer 100 may determine that one field remains for translation. Upon determining that one or more fields remain, translation server computer repeats steps 300-316 for the next field of the remaining one or more fields. If no fields remain to be translated, translation server computer 100 may continue the method with step 320. At step 320, if any words remain that have not been translated, the remaining words may be sent to an administrator for manual translation. For example, translation server computer 100 may send the remaining words or phrases to an administrative computing device with a request to translate the remaining words. In some embodiments, the remaining words or phrases are sent with the original listing and/or the translation of the phrases in the original phrasing in order to give the administrator context in manually creating the translation.

FIG. 3 and FIG. 4 depict an embodiment that comprises translating listings by prioritizing n-gram length in searching for translations. In other embodiments, translation server computer 100 translates the listings by attempting to minimize the number of n-grams in a particular listing. For example, in the method depicted in FIG. 3 and FIG. 4, the method of translating a six word phrase would comprise searching for 6-grams, followed by 5-grams, and so on. In an alternate embodiment, a method of translating a six word phrase may comprise searching for the whole phrase followed by searching for combinations of n-grams that result in the phrase being divided into two n-grams. Thus, in the alternative method, two 3-grams may be prioritized over two uni-grams and a 4-gram. Additionally, any combination of the two methods may be utilized in order to translate a field in a listing. For example, a combination method may include attempting to minimize the number of n-grams in a particular listing, but prioritizing longer n-grams over smaller n-grams when doing so would not change the number of n-grams in a listing. For example, if a six word phrase is capable of being broken into a 4-gram and a 2-gram or two 3-grams, translation server computer 100 may choose the first option.

In an embodiment, translating the one or more listings includes executing translation instructions 110 in order to perform one or more post processing steps. Post processing steps may include applying one or more stored rules to make corrections. Linguistic rules may be stored for each language to be applied to translations. For example, in English the adjective precedes the noun while in Hebrew the noun precedes the adjective. If a first translated n-gram comprises an adjective and a second n-gram comprises a noun, translation server computer 100 may apply the linguistic rules to flip the order of the n-grams.

Rules for post processing may also be created through machine learning from quality assurance. For example, translation server computer 100 may send listings and translations to an administrative computing device after translation and post processing steps have been performed. If translation server computer 100 receives a correction to a translation, translation server computer 100 may store data indicating that the correction was made. If translation server computer 100 receives multiple corrections of the same type, translation server computer 100 may identify a pattern in the corrections and apply the corrections to future translations. In the Hebrew example, translation server computer 100 may generate the linguistic rule after continuously receiving corrections for translations from English to Hebrew that include switching the order of nouns and adjectives. In an embodiment, translation server computer 100 sends translations that were created with a new post-processing rule to an administrative computing device for review. If translation server computer 100 receives a correction that affects the application of the rule, translation server computer 100 may stop applying the new rule or edit the situations in which the new rule is applied.

Translation server computer 100 may also send the translations to an administrative computing device for n-gram quality control. If translation server computer 100 receives a correction to an n-gram translation, translation server computer 100 may update the n-gram data repository to contain the new n-gram translations. Additionally and/or alternatively, translation server computer 100 may receive data indicating that an identified n-gram should not be considered an n-gram. For example, a grouping of words may better translated as multiple words instead of as a single unit. As another example, some phrases may appear frequently, but do not comprise a logical unit, thus causing some translations to contain errors when the n-gram is translated as one unit. In response to receiving an indication that an identified n-gram should not be considered an n-gram, translation server computer 100 may remove the identified n-gram from n-gram data repository 106 or may store data with the stored n-gram identifying the sequence as a bad n-gram, thereby preventing the n-gram from being automatically added to n-gram data repository 106 at a future time using the techniques described herein.

Adding to the N-Gram Data Repository

In an embodiment, n-gram data repository comprises n-grams extracted from a plurality of listing translations. Translation server computer 100 may receive a plurality of listings with a plurality of translations and store the plurality of listings and translations in listing data repository 108. For example, translation server computer 100 may initially receive listings for translation and send the listings to an administrative computing device for translation. Upon receiving one or more translations for the listings from the administrative computing device, translation server computer 100 may store the listings and translations in listing data repository.

To identify n-grams, translation server computer 100 may execute n-gram identification instructions 118 to identify words or phrases that occur in a threshold number of listings. For example, if n-gram identification instructions 118 are programmed or configured to require five occurrences of a phrase as a threshold number, translation server computer 100 may identify a phrase that appears in five different listings. In an embodiment, the threshold number of listings comprises listings that include the same words or phrases with a same corresponding translation. For example, if four listings include a phrase with one translation and a fifth listing contains the phrase with a different translation; translation server computer 100 may determine that the phrase should not be identified as an n-gram. In embodiments, n-gram identification instructions 118 include different thresholds for different sizes of n-grams. For example, n-gram identification instructions 118 may include a smaller threshold for larger n-grams. Thus, translation server computer 100 may identify 6-grams using a relatively small threshold of occurrences, such as three occurrences, while identifying a 2-gram may comprise using a relatively large threshold of occurrences, such as fifteen occurrences.

Translation server computer 100 may utilize pattern matching logic to identify translations for the identified n-grams. For example, if a phrase is found in ten different listings, translation server computer 100 may identify a phrase in the translations of the ten different listings that comprise the same words in the same field. After identifying the n-grams candidates to be added to n-gram data repository 106, translation server computer 100 may send one or more n-gram candidates and corresponding translations to an administrative computing device for validation. Translation server computer 100 may receive validation data from the administrative computing device that identifies, for each n-gram, whether the translation was correct, the translation was incorrect, or whether the n-gram is a bad n-gram. Translation server computer 100 may store the validation data and update the methods used to identify n-grams based on the validation data. For example, if translation server computer 100 continually receives validation data that identifies n-grams with a particular word as being bad n-grams, translation server computer 100 may stop creating n-grams with the particular word.

In an embodiment, translation server computer 100 creates a confidence score for each identified n-gram. The confidence score may describe the likelihood that a word or sequence of words is an n-gram and can be translated using a corresponding translation. The confidence score may be created based on a number of occurrences of an n-gram, a percentage of occurrences of the n-gram that can be matched to a corresponding translation, and/or occurrences of variations of the n-gram with the same or different corresponding translations. The confidence score for an n-gram may be stored in n-gram data repository 106 along with the n-gram and translation. Translation server computer 100 may increase the confidence score each time a translation using the n-gram is verified by an administrative computing device and decrease the confidence score each time a translation using the n-gram is rejected by the administrative computing device.

In an embodiment, translation server computer 100 only replaces phrases in listings with corresponding translations if a confidence score for the n-gram exceeds a particular threshold. For example, translation server computer 100 may require a ninety percent confidence score in order to replace an n-gram with a corresponding translation. If a ninety percent confidence score does not exist for the particular n-gram, the remaining words or phrases may be sent to the administrative computing device for translation.

If the translation matches the n-gram translation stored in n-gram data repository 106, translation server computer 100 may increase the confidence score for the particular n-gram. Additionally and/or alternatively, translation server computer 100 may identify a range of confidence scores in which an n-gram may be translated using the techniques described herein, but the translation for the listing requires verification. For example, translation server computer 100 may translate n-grams that contain a confidence score between seventy five percent and ninety percent, but if such an n-gram is translated translation server computer 100 may send the listing and listing translation to an administrative computing device for quality control.

N-grams may be added to n-gram data repository 106 periodically or after translation server computer 100 receives new listing translations. For example, if translation server computer 100 is unable to translate a full listing using the techniques described herein, translation server computer 100 may send the untranslated portions of the listing to an administrative computing device. Upon receiving translations of the untranslated portions of the listing, translation server computer 100 may determine whether any new n-grams should be added to n-gram data repository 106 based on the received translations. Additionally and/or alternatively, translation server computer 100 may send a portion of received listings to an administrative computing device for manual translation. For example, translation server computer 100 may send every tenth or hundredth listing to the administrative computing device in order to increase the number of listings that contain accurate translations for use in creating new n-grams.

In an embodiment, upon identifying a new translation and storing the new translation in n-gram data repository 106, translation server computer 100 may determine whether any prior translations contain the newly identified n-grams. For example, after receiving a new plurality of listings and listing translations, translation server computer 100 may identify "Butterfly Knife Sharpener" as a new n-gram with a translation in German of "Schmetterlingsmesserschärfer." In response to identifying the new n-gram, translation server computer 100 may identify a prior listing that included only "Butterfly Knife" as an n-gram. Translations server computer 100 may determine that a translation using the new n-gram would differ from the previous translation. In response to determining that the translations differ, translation server computer 100 may create an updated listing using the new translation and send the updated translation to a listing website which contains the original translation with a request to replace the original translation with the updated translation.

Translating Listings Using a Listing Data Repository

While FIG. 3 and FIG. 4 are described in terms of an n-gram data repository, in an embodiment translation server computer 100 identifies n-grams directly from a plurality of listing translations when translating a new listing. For example, translation server computer 100 may receive a plurality of listings and translations and store the plurality of listings and translations in listing data repository 108. For a translation of a particular listing, translation server computer 100 may identify candidate n-grams using the methods described above. After identifying a candidate n-gram, translation server computer 100 may search through the plurality of stored listings for the identified candidate n-gram. If translation server computer 100 identifies a threshold number of instance of the identified candidate n-gram in the plurality of listings, translation server computer 100 may identify a translation for the candidate n-gram in the plurality of listing translations.

Translation server computer 100 may also produce a confidence score describing the likelihood that each identified candidate n-gram can be translated as an n-gram. The confidence score may be generated based on a number of occurrences of the exact words in the n-gram and a percentage of occurrences of the exact words in the n-gram in which a translation of the listing contains the same translations. Additionally and/or alternatively, translation server computer 100 may generate or adjust a confidence score for the candidate n-gram based on a similarity to other n-grams. For example, a listing may include a misspelling, such as "Butterfy Knife." If translation server computer 100 identifies a large number of instances of the phrase "Butterfly Knife," translation server computer 100 may generate a confidence score describing the likelihood that "Butterfy Knife" should be translated in the same way as "Butterfly Knife." If the confidence score exceeds a particular threshold, such as ninety percent, translation server computer 100 may treat "Butterfy Knife" as an n-gram with the same translation as "Butterfly Knife."

The methods described in this section may be used as a sole method of identifying n-grams in a listing or in combination with the methods described above. For example, an n-gram data repository may be utilized initially for identifying n-grams in a particular listing. For any remaining untranslated words or phrases, translation server computer 100 may search through prior listings in order to identify other n-gram candidates. N-gram candidates identified through the plurality of listing translations may be used to translate the particular listing and subsequently added to n-gram data repository 106.

In an embodiment, translations may be produced in batches instead of individually. For example, translation server computer 100 may receive a plurality of listings for a particular period of time, such as a single day. Translation server computer 100 may identify, in the plurality of listings, a plurality of candidate n-grams. Identifying the plurality of n-grams may comprise identifying sequences of words that appear in more than a threshold number of the received listings. As with the n-gram identification described above, the threshold number of listings may include a particular threshold for all n-grams, such as a threshold of five listings per n-gram, or a different threshold number for each n-gram size. Once candidate n-grams have been identified in the received listings based on a number of occurrences, translation server computer 100 may search n-gram data repository 106, listing data repository 108, or a combination of the two for occurrences of the candidate n-grams. Upon identifying the candidate n-grams in either n-gram data repository 106 or listing data repository 108, translation server computer 100 may identify a translation for the candidate n-gram. By generating translations in batches, translation server computer 100 may increase the efficiency with which useful n-grams are identified, extracted, and translated. A large number of available listings for translating may help translation server computer 100 identify n-gram candidates that would affect the translations of a large number of listings if a translation is identified in prior listings or in n-gram data repository 106.

Translation Fields

In an embodiment, translation server computer 100 identifies and stores n-grams for particular categories. For example, a listing website may include categories of "software," "games," "books," and "fashion." Translation server computer 100 may separate received listings and translations into categories associated with the listings. Translation server computer 100 may create translations using any of the methods described above for each category. Category specific translations may be stored in separate category specific data repositories or in a single data repository with category identifiers. For example, translation server computer 100 may identify n-grams for each category and store the n-grams in data repository 106 with an identification of the category of the listing. Additionally and/or alternatively, translation server computer 100, upon receiving a listing to translate, may identify a category of the listing and search through listings of the same category for n-grams. By separating n-grams into translation categories, translation server computer 100 may increase the accuracy of translations using the methods described herein. For example, a phrase that is used repeatedly in software may not be used to translate a phrase in a listing belonging to the "fashion" category. For each category, translation server computer 100 may also store a list of brands and models and their corresponding translations.

In some embodiments, translation server computer 100 only uses category specific translations for each listing. In other embodiments, translation server computer 100 first searches for category specific translations and, if any words or phrases remain for translation, searches for translations from other translation categories. Translation server computer 100 may also be programmed or configured to prioritize categories that are similar to the particular category of the listing. For example, if a particular listing is associated with the category "books," translation server computer 100 may first look for n-grams in the "books" category. If translation server computer 100 identifies candidate n-grams that do not contain translations in the "books" category, translation server computer 100 may perform a search in the "movies" and "games" categories before performing a search in the "fashion" category.

Translation server computer 100 may also store region specific translations for particular n-grams. For example, certain phrases may be common in one region but offensive in others. For the certain phrases, translation server computer 100 may store region specific translations for the regions in which the common translation may be offensive. In an embodiment, translation server computer 100 first searches for region specific translations for each n-gram. If no region specific translations exist for the n-gram, translation server computer 100 may proceed with searching for other translations for the n-grams. Translation server computer 100 may add region specific translations using machine learning techniques. For example, if translation server computer 100 receives an indication that a particular translation of an n-gram for one region is incorrect but that the same translation of the n-gram for a different region is correct, translation server computer 100 may store the translation as a general translation for the n-gram and store the corrected translation as a region specific translation for the n-gram.

Listing Generation

Referring again to FIG. 2, at step 210 one or more second listings are generated from the translations of the first listing. Translation server computer 100 may create a different listing for each website to which the listing is to be propagated. Thus, if translation server computer 100 receives a request to send the listing to two different websites in Germany, translation server computer 100 may create two listings in German. Translation server computer 100 may generate the listings by identifying different fields used by the second listing website and identifying the data that belongs in the fields. As a simple example, if the first listing website and the second listing website both use a title and a description, translation server computer 100 may identify the translations of the title from the first listing website to be entered into the field for the title of the second listing and the translations of the description from the first listing website to be entered into the description field for the second listing website.

In an embodiment, generating the one or more listings includes translating values from the first listing to be entered into the second listing. Translation server computer 100 may execute listing generation instructions 112 to identify first region specific values in the first listing and convert the first region specific values into second region specific values for the second listing. A region specific value may include currency values. Translation server computer 100 may periodically receive exchange rates for various currency types over a network. Additionally and/or alternatively, translation server computer 100 may request exchange rates over a network based on received listings. For example, a first listing may include a price term in dollars. For a listing in South Korea, translation server computer 100 may request an exchange rate from dollars to won and convert the price in the listing from dollars to won. Region specific values may also include size values. For example, translation server computer 100 may be programmed or configured to convert length or volume values from the English system to the Metric system.

Addressing Listing Limitations

In an embodiment, executing listing generation instructions 112 causes translation server computer 100 to identify listing limitations of second listing website server 140. For example, second listing website server 140 may contain a character limit for the title of a listing. Translation server computer 100 may identify the character limit for listing titles at second listing website server 140 and determine whether the title of the generated listing exceeds the character limit set by second listing website server 140. If the title of the generated listing exceeds the character limit set by second listing website server 140, translation server computer 100 may execute listing generation instructions 112 to perform one or more methods of editing a listing to meet limitations of second listing website server 140.

Figure 5:
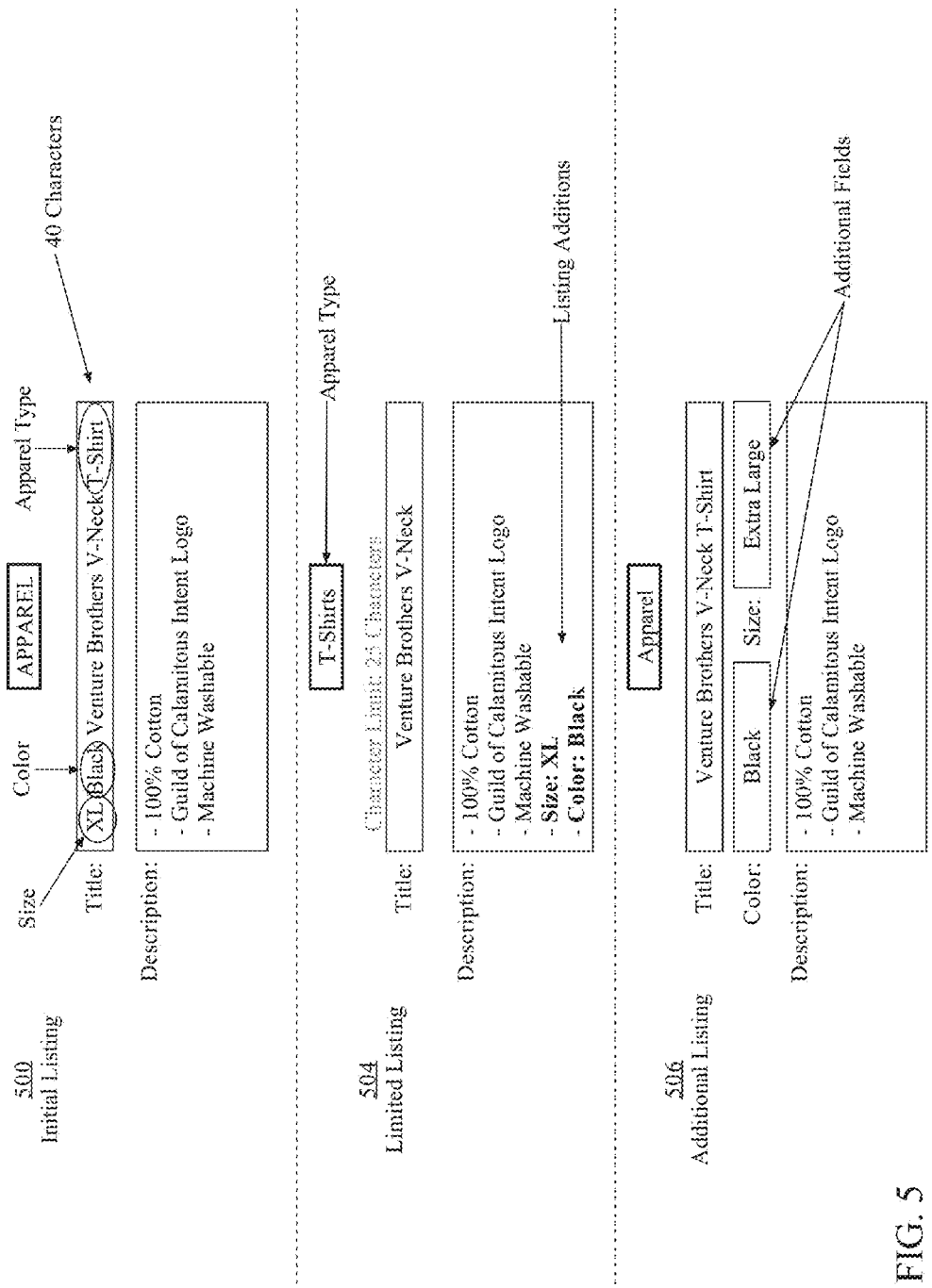
FIG. 5 depicts a method of editing a listing to meet limitations, requirements, or parameters of a second listing website server.

FIG. 5 depicts a method of editing a listing to meet limitations, requirements, or parameters of a second listing website server. FIG. 5 contains initial listing 502, limited listing 504, and additional listing 506. Initial listing 502 represents a listing as received from first listing website server 130 or as translated by translation server computer 100. Initial listing 502 contains a title, a description, and a category identifier. The title of initial listing 502, "XL Black Venture Brothers V-Neck T-Shirt" is forty characters long. Limited listing 504 contains a character limit of twenty five characters. Translation server computer 100 may identify the character limit of limited listing 504 and determine that the title of initial listing 502 contains too many characters to fit inside the title of limited listing 504.

In response to determining that the number of characters in the title of initial listing 502 exceeds the character limit for limited listing 504, translation server computer 100 may identify words in the title of initial listing 502 that may be removed from the title and placed elsewhere. Translation server computer 100 may identify multiple words or phrases in the title of initial listing 502 that may be removed until the title no longer exceeds the character limit for limited listing 504. Translation server computer 100 may then identify a field in limited listing 504 in which the removed words may be placed. For example, translation server computer 100 may be programmed or configured to identify certain types of descriptors in a title that can be placed in the description section of a listing or in a separate field.

Identifying the certain types of descriptors may include searching through a data repository which contains descriptor categories and values. For example, a color category may be associated with various colors, such as black, blue, and red. Translation server computer 100 may identify the word "black" in the title of initial listing 502 as a descriptor in the category of color. In response to identifying the word "black" in the title of initial listing 502, translation server computer 100 may remove the word "black" from the title and add the word to the description. In an embodiment, translation server computer 100 adds language for readability. For example, in limited listing 504, translation server computer 100 added "Color:" before the word "Black."

The data repository may also contain variations of different types of words or phrases. For example, initial listing 502 contains a size descriptor of "XL." Translation server computer 100 may contain variations of size descriptors, such that translation server computer 100 may identify "XL," "X-L," and "Extra Large" as belonging to the same category. In an embodiment, translation server computer 100 may substitute one version of a size descriptor for a shorter version of the size descriptor in order to meet the character limit of the limited listing 504. For example, if the title of initial listing 502 contained the words "Extra Large," translation server computer 100 may determine that the title of initial listing 502 could be shortened by replacing "Extra Large" with "XL."

Translation server computer 100 may also determine whether words in the title of initial listing 502 represent a category type in limited listing 504. For example, the category for initial listing 502 is "Apparel." Limited listing 504 contains narrower categories. Translation server computer 100 may identify the word "T-Shirt" from the title of initial listing 502 as a category type of limited listing 504 and generate the listing for the category of "T-Shirt." As the category type contains the descriptor "T-Shirt," translation server computer 100 may identify the word "T-Shirt" in the title of initial listing 502 as a word that may be removed from the listing without causing the listing to lose information. Thus, while "color" and "size" were removed from the title of initial listing 502 and placed into the description of limited listing 504 in order to preserve the information, "T-Shirt" was removed entirely from initial listing 502, as the information provided by "T-Shirt" was available in the category type.

In an embodiment, translation server computer 100 uses sales data to identify words in the title of a listing that may be removed from the title. For example, translation server computer 100 may receive listings 142 and additional listing data 144 from second listing website server 140 associated with other customers. Additional listing data 144 may include sales data for listings from the other customers. Translation server computer 100 may compare listings of the other customers to identify words in the title of the listing that are correlated with higher sales. For example, translation server computer 100 may compare listings that contain a color descriptor in the title with listings that do not contain the color descriptor in the title. If translation server computer 100 identifies a large difference in sales between listings that contain the color descriptor in the title and listings that do not contain the color descriptor in the title, translation server computer 100 may determine that the color descriptor should not be removed from the title. In contrast, if there is little difference in sales between listings that contain the color descriptor in the title and listings that do not contain the color descriptor in the title, translation server computer 100 may identify the color descriptor as an item that may be removed from the title and placed into the description.

Translation server computer 100 may also be programmed or configured to identify helpful words in the title and harmful words in the title. Translation server computer 100 may compare titles containing different colors to determine if certain colors in the title correlated to increased or decreased sales. For example, translation server computer 100 may determine that T-Shirts with the color "Black" in the title generally sold better than T-Shirts with the color "Yellow" in the title. If translation server computer 100 receives a listing with the color "Black" in the title, translation server computer may determine that the color "Black" should not be removed from the title. In contrast, if translation server computer 100 receives a listing with the color "Yellow" in the title, translation server computer 100 may remove the color from the title and place the color into the description.

Translation server computer 100 may also be programmed or configured to identify words that are important to the title. Translation server computer 100 may compare the title of initial listing 502 with the titles of other listings in the same category. Translation server computer 100 may identify words in the title of initial listing 502 that are uncommon in other listings of the same category. For example, initial listing 502 contains the title "XL Black Venture Brothers V-Neck T-Shirt." Translation server computer 100 may identify "XL," "Black," and "T-Shirt" as relatively common in listings under the "Apparel" category. Translation server computer 100 may further identify "V-Neck" as less common in the apparel category and "Venture Brothers" as the least common in the apparel category. Thus, translation server computer 100 may identify "Venture Brothers" and "V-Neck" as important distinguishing elements of the title. In generating limited listing 504, translation server computer 100 may prioritize the distinguishing elements of the title and remove or relocate the more common words of the title.

Additional Fields

In an embodiment, translation server computer 100 is programmed or configured to identify additional fields used by second listing website server 140. For example, initial listing 502 contains fields for title and description. Additional listing 506 contains fields for title, color, size, and description. Translation server computer 100 may be programmed or configured to identify additional fields in additional listing 506 and identify data from initial listing 502 that may be placed into the additional fields. In an embodiment, in response to determining that a number of words in the title of initial listing 502 exceeds a character limit for additional listing 506, translation server computer 100 identifies additional fields in which words from the title of initial listing 502 may be placed. For example, translation server computer 100 may identify the word "Black" in initial listing 502 as a color. Translation server computer 100 may further identify a "Color" field in additional listing 506. Translation server computer 100 may extract the word "Black" from initial listing 502 and place the word in the "Color" field of additional listing 506.

Translation server computer 100 may also be programmed or configured to search through fields of a listing for data which satisfies an optional or required field of a listing website. For example, a listing website may require a "Color" field to be filled out for any listings in the apparel section. Translation server computer 100, in response to identifying the "Color" field used by the listing website, may search the generated listing for any words that fall within the color category. If translation server computer 100 initially received or generated limited listing 504, translation server computer 100 may recognize the word "black" in the description and place the word "black" in the color field of additional listing 506. Additionally and/or alternatively, translation server computer 100 may recognize the word "Color" in limited listing 504 and determine that the following word or words likely defines a color. In some embodiments, upon adding the descriptor to the additional fields, translation server computer 100 removes the descriptor from the prior field. For example, if translation server computer 100 received or generated initial listing 502, translation server computer 100 may remove the word "Black" from the title after placing it into the "Color" field. In other embodiments, translation server computer 100 leaves the descriptor in the initial field unless a character or word limitation is currently exceeded by the words or characters in the field.

In an embodiment, translation server computer 100 may be configured to identify variations of a word in the initial listing in order to satisfy one of the additional fields. For example, additional listing 506 contains a drop down menu for size which includes sizes of "Extra Small," "Small," "Medium," "Large," and "Extra Large." Initial listing 502 does not contain any of the sizes included in the drop down box of 506. Translation server computer 100 may be programmed or configured to search for the variations of each of the options within initial listing 502. In response to identifying "XL" in initial listing 502 as a variation of "Extra Large," translation server computer 100 may select the "Extra Large" option from the drop down menu of additional listing 506. If translation server computer 100 identifies fields in the initial listing that are not available in the listings from second listing website server 140, translation server computer 100 may remove data from the fields and place the data into fields used by second listing website server 140. For example, if the initial listing contained a "Color" field that had a value of "Black" and the second listing website does provide a "Color" field, translation server computer 100 may add "Color: Black" to the description.

In an embodiment, translation server computer 100 may augment a listing with additional stored data regarding a particular inventory item. For example, a specific brand of computer monitor may have the same specifications regardless of the seller of the computer monitor. Translation server computer 100 may store the specifications for different types of identifiable brand name products. Translation server computer 100 may use the stored specifications for the product to fill in the details of a listing or to add information to required fields for the listing. Thus, if the particular computer monitor has a defined screen size, translation server computer 100 may use the defined screen size from the stored specifications into the description section of a generated listing. Additionally and/or alternatively, if a listing website server requires a screen size to be input into a screen size field, translation server computer 100 may use the screen size from the stored specifications for the specific brand of computer monitor to complete the required field.

Market Selection

Referring again to FIG. 2, at step 212 the one or more second listings are sent to one or more second listing website servers. For example, translation server computer 100 may identify one or more second listing websites in which to propagate the one or more listings. Upon identifying the one or more second listing websites, translation server computer 100 may execute application server interface instructions 104 in order to make calls to the APIs of the one or more second listing website servers to place a listing on the one or more second listing websites.

In an embodiment, translation server computer 100 executes selection instructions 116 to identify the one or more second listing websites in which to propagate the one or more listings. Selection instructions 116 may cause translation server computer 100 to identify one or more preferable markets for the one or more listings based on additional listing data 134 received from first listing website server 130 or additional listing data 144 received from one or more of second listing website servers 140. Identifying one or more preferable markets may include identifying regions where there is currently a demand for an inventory item of the one or more listings, where there is currently a demand for inventory items in the category of the one or more listings, or where data received from client computing device includes a request to either sell in the region or to not sell in the region.

Translation server computer 100 may use additional listing data 134 received with a particular listing to identify a demand for an inventory item in a particular region. For example, additional listing data 134 may include past transaction data which identifies a location of the transacting device or a location to which the inventory item is sent. Additional listing data 134 may also identify a location of a device which has searched for or viewed the inventory item. Translation server computer 100 may identify locations from which a computing device has viewed the inventory item, purchased the inventory item, or to which the inventory item has been sent. In response to identifying a demand from a geographic region other than the region of first listing website server 130, translation server computer may select the geographic region as a location to which to propagate the one or more first listings. For example, if a listing for a particular music album sold in the United States has been viewed repeatedly by different computers in Germany, translation server computer 100 may translate the listing into German and send the listing to a listing website in Germany. If multiple people in Russia have purchased the album, translation server computer 100 may translate the listing into Russian and send the listing to a listing website in Russia.

Translation server computer 100 may also use additional listing data 144 to identify a demand for an inventory item in a particular region. Additional listing data 144 may include past transaction data for any other listing websites. For example, translation server computer 100 may perform the methods described herein for customers with listings in a wide variety of locations. For each customer, translation server computer 100 may receive listings and additional listing data which includes past transaction information. Translation server computer 100 may identify, through the past transaction information, locations in which a particular inventory item is in high demand. For example, a customer in the United States may wish to propagate a listing for a particular brand of handheld gaming device. Translation server computer 100 may identify, in the past transaction information for other customers in other locations, locations in which the particular brand of handheld gaming device is frequently purchased. Translation server computer 100 may select the locations in which the particular brand of handheld gaming device is frequently purchased as a location in which to propagate the listing.

Translation server computer 100 may also use additional listing data 144 to identify a demand for a category of inventory item in a particular region. Translation server computer 100 may use past transaction data from additional listing data 144 to identify locations in which a particular category of item either sells frequently or sells at a relatively high price. For example, translation server computer 100 may receive a request to propagate a listing for a particular comforter to one or more other listing websites. Translation server computer 100 may search past transaction data at different locations to identify locations where comforters are frequently purchased. Additionally and/or alternatively, translation server computer 100 may identify regions in which comforters sell for a higher price. For instance, if translation server computer determines that a comforter in Russia sells for the equivalent of two hundred dollars, but the same comforter sells for the equivalent of one hundred dollars in Argentina, translation server computer 100 may identify Russia as a preferable market to sell the particular comforter.

Translation server computer 100 may also identify a preferable market for the one or more listings by identifying locations in which key words from the title of the one or more first listings are associated with high sales. For example, if the title for the particular comforter is "Venture Brothers Comforter," translation server computer 100 may search the transaction data from the multiple locations for locations where "Venture Brothers" items sell frequently. If translation server computer 100 identifies a particular location where items with the words "Venture Brothers" are frequently purchased, translation server computer 100 may create a translation for the listing in the language of the particular location and send the translated listing to a listing website server in the particular location.

By receiving past sales data from each listing website server, translation server computer 100 is able to identify ideal locations to propagate listings, thereby increasing the sales of each customer of translation server computer 100. Additionally, a customer may set a preference to either have a listing propagated to particular regions or to have a listing not propagate to particular regions. For example, if a region is known for losing packages sent to the region, a customer may select the region through a graphical user interface executing on client computing device 120 as a region in which the inventory item is not to be sold. Additionally, if the customer believes there is a strong market for the inventory item in a particular region, the customer may request that translation server computer 100 propagate the listing to at least the particular region.

Listing Selection

In an embodiment, translation server computer 100 receives a plurality of listings from first listing website server 130 that are associated with client computing device 120. Translation server computer 100 may execute selection instructions 116 to identify preferable listings of the plurality of listings to propagate and preferable locations in which to propagate the listings. Translation server computer 100 may employ the methods described above for each listing of the plurality of listings to identify preferable locations for the listing. Additionally and/or alternatively, translation server computer 100 may use additional listing data 134 and additional listing data 144 to identify preferable listings to propagate.

Translation server computer 100 may identify which listings of the plurality of listings have received high sales at first listing website server 130. In response to determining that one or more particular listings have received relatively high sales in comparison to the rest of the listings, translation server computer 100 may identify the one or more particular listings as preferable listings for the purpose of propagation to other regions. For example, translation server computer 100 may receive three listings, each identifying a different type of shoe. If the first two listings received hundreds of sales while the third listing has only received twenty sales, translation server computer 100 may identify the first two listings as preferable. Upon identifying the first two listings as preferable, translation server computer 100 may translate and propagate the first two listings, but not the third.

Translation server computer 100 may also identify listings at the first listing website that have received relatively high sales with respect to competing listings at the first listing website. For example, translation server computer may determine that a listing associated with client computing device 120 for a phone has received one hundred sales in the past three months while a listing associated with client computing device 120 for a watch has only received twenty sales in the past two months. Translation server computer 100 may compare the sales data for the phone to other sales data from first listing website server 130 for phones. Translation server computer 100 may also compare the sales data for the watch to other sales data from first listing website server 130 for watches. If translation server computer 100 determines that out of three phone sellers, the phone listing associated with client computing device 120 only has ten percent of the sales, but that out of one hundred watch sellers, the watch listing associated with client computing device 120 has fifty percent of the sales, translation server computer 100 may determine that the watch listing is a preferable listing. Additionally and/or alternatively, translations server computer 100 may determine that the watch listing is preferable for regions in which watch sales are equivalent to phone sales, but that the phone listing is preferable for regions that have similar sales statistics as the first listing website.

Listings from Multiple Locations

In an embodiment, translation server computer 100 is programmed or configured to receive requests from client computing device 120 to propagate listings from multiple first listing websites. For example, client computing device 120 may identify multiple listing websites on which a user of client computing device 120 has listings. Client computing device 120 may also authorize translation server computer 100 to access the listings at each of the multiple listing websites that belong to the user of client computing device 120. The multiple listing websites may be contained in the same region or in different regions. For example, a user may maintain multiple listings for the same items on multiple listing websites in the United States. Additionally, a user may maintain listings for the same items in various regions, such as in the United States and Canada. Translation server computer 100 may be programmed or configured to identify listings from different listing websites that describe the same inventory item. Translation server computer 100 may identify listings that describe the same inventory item by identifying attributes between the two listings that match, such as quantity, price, or keywords in the title. Additionally and/or alternatively, client computing device 120 may indicate which of the listings at the first listing website servers describe the same inventory.

In an embodiment, translation server computer 100 executes selection instructions 116 to determine which of the listings describing the same inventory item to translate. While two listings may describe the same inventory item, the listings may contain variations. For example, one listing may contain the color and size of the item in the title while the other listing contains the color and size of the item in the description. Translation server computer 100 may identify a listing at a first listing website server as preferable over a corresponding listing at a corresponding listing website server.

Translation server computer 100 may determine that the listing at the first listing website server is preferable over the corresponding listing at the corresponding listing website server by using additional listing data 134. Translation server computer 100 may search through past transaction data for each of the listings to determine which listing has received more sales. In an embodiment, translation server computer 100 selects the listing which has received the most sales for translation and propagation. Translation server computer 100 may also rate the listings by sales of the listings relative to sales of other listings in the same category. Thus, while the corresponding listing may have received more sales than the first listing, if the first listing received a higher percentage of sales in the category of the listing, translation server computer 100 may still select the first listing as preferable over the corresponding listing.

Updating Listings

In an embodiment, translation server computer 100 executes listing update instructions 114 to update listings related to a particular listing in response to identifying a change in the particular listing. For example, listing A at listing website A may be translated and used to create listing B at listing website B and listing C at listing website C. If translation server computer 100 determines that a field in listing B has changed, translation server computer 100 may execute listing update instructions 114 to update listing A and listing C.

Translation server computer 100 may update related listings in response to determining that a price has changed, determining that a quantity has changed, or identifying a new n-gram that changes one or more of the translations. For example, if client computing device 120 lowers the price of a listing, the listing website server may send a message to translation server computer 100 indicating the change in price. Translation server computer 100 may then send updates to each other listing website server that indicates the change in price. Additionally and/or alternatively, translation server computer 100 may identify a change in price due to a change in the exchange rate between the location of first listing website server 130 and the location of second listing website server 140. If translation server computer 100 determines that an exchange rate has changed, translation server computer 100 may recalculate the price of the listing at second listing website server 140 and send a price change to second listing website server 140. As another example, if the listing specifies a limited number of the inventory item, translation server computer 100 may send updates to each of the listing website servers in response to determining that one or more of the inventory items was sold. Thus, if a listing in the United States identifying seven unique keyboards is propagated to France and one of the keyboards is sold in France, translation server computer 100 may update the listing in the United States to indicate that only six of the unique keyboards remain.

Dynamic Pricing

In an embodiment, translation server computer 100 varies the price of a listing at each location based on additional listing data received from each listing website server. For example, translation server computer 100 may initially send a request to client computing device 120 for a minimum price at which the user of client computing device 120 is comfortable selling an inventory item of a particular listing. Translation server computer 100 may then use the techniques described herein to identify the best markets for the listing. Based on sales data of other inventory items in the same category, with the same attributes, or with the same keywords at the second listing websites, translation server computer 100 may identify a price at which the inventory item is likely to sell. Translation server computer 100 may use the identified price in the translated listing. If a threshold period of time, such as a week, passes without the inventory item selling, translation server computer 100 may be programmed or configured to gradually lower the price of the inventory item. If the inventory item begins selling quickly, translation server computer 100 may be programmed or configured to gradually raise the price of the inventory item.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
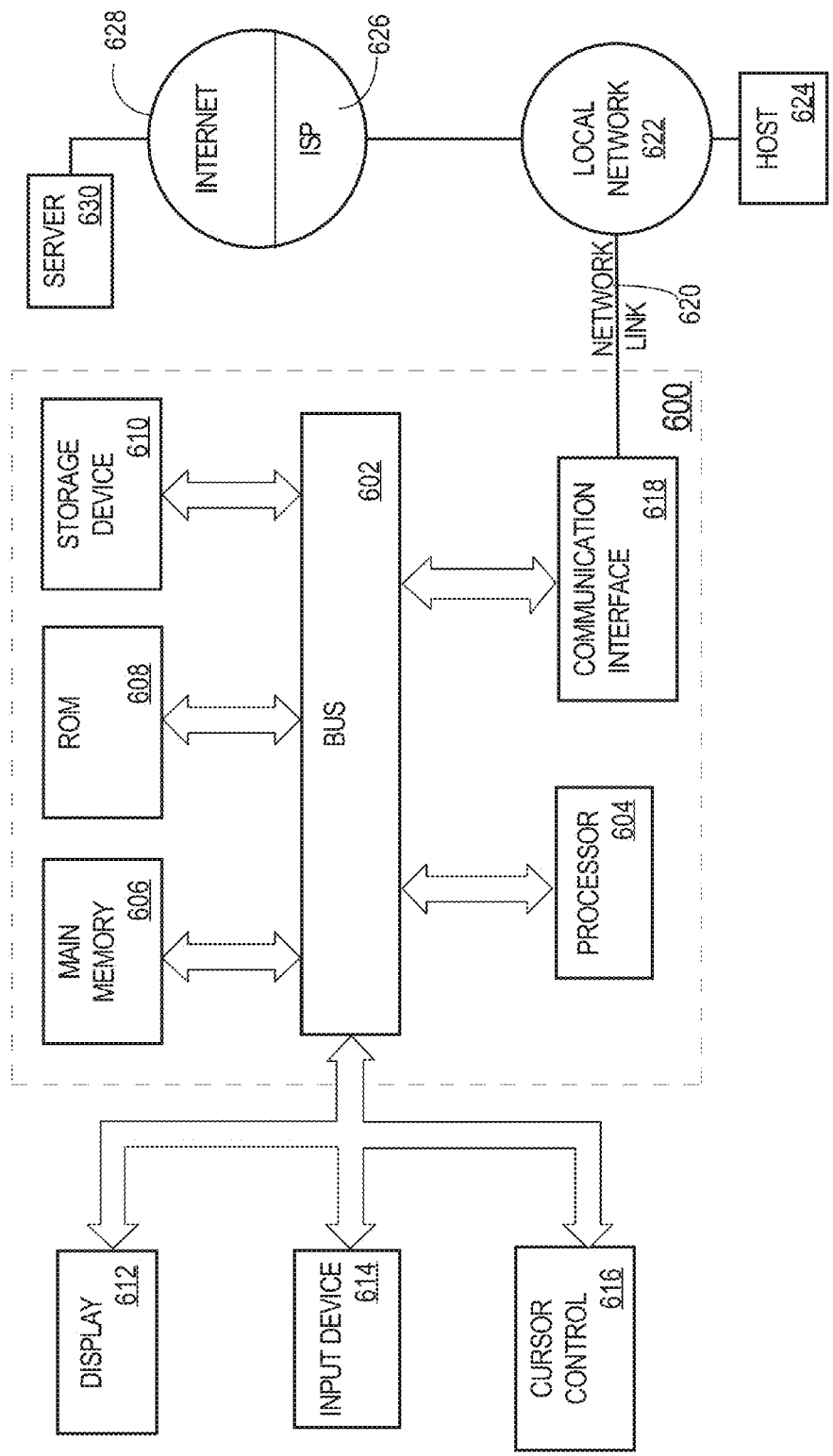
FIG. 6 illustrates a computer system upon which embodiments may be implemented.

For example, FIG. 6 is a block diagram that illustrates a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing method comprising:

using user interface instructions programmed in a translation server computer, receiving a request from a client computing device to provide one or more translated listings of one or more first listings to one or more second listing website servers, using one or more second languages;

wherein the one or more first listings are hosted at one or more first listing website servers and expressed in a first language and associated with the client computing device;

using application server interface instructions programmed in the translation server computer, making one or more calls to an application programming interface of the one or more first listing website servers for the one or more first listings;

using the application server interface instructions of the translation server computer, receiving, from the one or more first listing website servers, the one or more first listings, and storing the one or more first listings in memory of the translation server computer;

wherein the translation server computer is coupled to a digitally stored n-gram data repository that comprises digitally stored records representing a plurality of sequences of words and corresponding translations for each of the plurality of sequences of words;

using translation instructions of the translation server computer, translating the one or more first listings from the first language into one or more translated listings that use the one or more second languages, by performing at least:
  searching the digitally stored n-gram data repository for a first sequence of words extracted from the one or more first listings;
  determining that the first sequence of words is not in the digitally stored n-gram data repository;
  in response to determining the first sequence of words is not in the digitally stored n-gram data repository, repeating the following steps for any number of iterations until finding a particular sequence of words in the n-gram data repository:
    identifying a new sequence of words that is different than any other searched sequence of words and has at most the same number of words as any other searched sequence of words;
    searching the digitally stored n-gram data repository for the new sequence of words;
  in response to determining the particular sequence of words is in the digitally stored n-gram data repository, identifying a corresponding translation for the particular sequence of words in the second language;
  replacing the particular sequence of words in the first one or more listings with the corresponding translation;
using listing generation instructions of the translation server computer, generating one or more second listings from the one or more translated listings;
using the application server interface instructions of the translation server computer, sending the one or more second listings to the one or more second listing website servers.

2. The method of claim 1 further comprising:
using the application server interface instructions of the translation server computer, receiving a plurality of initial listings in the first language from a plurality of listing website servers;
using the application server interface instructions of the translation server computer, receiving a plurality of translations for the plurality of listings in the second language;
identifying, in the plurality of initial listings, a repeated sequence of words that occurs in at least a threshold number of listings of the plurality of initial listings;
identifying, in the plurality of translations for the plurality of initial listings, a repeated translation of the repeated sequence of words that occurs in the at least a threshold number of listings of the plurality of listings;
saving the repeated sequence of words and the repeated translation of the repeated sequence of words in the digitally stored n-gram data repository as a new n-gram.

3. The method of claim 2, further comprising:
in response to saving the new n-gram in the digitally stored n-gram data repository, searching the one or more first listings for repeated sequence of words from the new n-gram;
in response to identifying the repeated sequence of words in the one or more first listings, comparing a translation of the repeated sequence of words in the one or more second listings with the repeated translation of the repeated sequences of words from the new n-gram;
in response to determining that the translation of the repeated sequence of words in the one or more second listings differs from the repeated translation of the repeated sequence of words from the new n-gram, generating one or more updated second listings;
using the application server interface instructions of the translation server computer, sending the one or more updated second listings to the one or more second listing website servers to replace the one or more second listings.

4. The method of claim 1 further comprising:
receiving, from the one or more first listing website servers, additional listing data of the one or more first listings;
identifying, from the additional listing data of the one or more first listings, a category corresponding to the one or more first listings;
translating one or more words or phrases of the one or more first listings from the first language to the one or more second languages using category specific translations stored in one or more category specific translation data repositories.

5. The method of claim 1 further comprising:
identifying, for a particular listing website server of the one or more second listing website servers, a geographic region associated with the one or more second listing website servers;
translating, for the particular listing website server of the one or more second listing website servers, one or more words or phrases of the one or more first listings from the first language to the one or more second languages using region specific translations stored in one or more region specific translation data repositories.

6. The method of claim 1 further comprising:
identifying a character limit for a particular field of a particular listing website server of the one or more second listing website servers;
determining that a number of characters in the particular field in the one or more translated listings exceeds the character limit for the particular field for the particular listing website server;
identifying one or more words in the particular field in the one or more translated listings that may be removed from the particular field;
identifying a different field for the one or more words; and
adding the one or more words to the different field.

7. The method of claim 1 further comprising:
identifying an input field in a particular website of the one or more second listing website servers for which a direct translation of the one or more first listings does not create data;
identifying, in the one or more translated listings, one or more words that may be placed in the input field;
adding the one or more words to the input field of a particular listing corresponding to the particular website.

8. The method of claim 1 wherein using the translation instructions of the translation server computer, translating the one or more first listings from the first language to the second language comprises identifying a preferable subset of the one or more first listings and translating only the preferable subset of the one or more first listings from the first language to the second language.

9. The method of claim 8, further comprising:
receiving, from the one or more first listing website servers, additional listing data of the one or more first listings;

wherein the additional listing data of the one or more first listings comprises past sales data for a particular period of time for each listing of the one or more first listings wherein identifying the preferable subset of the one or more first listings comprises determining that the preferable subset of the one or more first listings have received higher sales during the particular period of time than one or more other listings of the one or more first listings.

10. The method of claim 8, further comprising:

receiving, from the one or more second listing website servers, a plurality of listings and past sales data for the plurality of listings during a particular period of time;

wherein identifying the preferable subset of the one or more first listings comprises, identifying one or more attributes in the preferable subset of the one or more first listings that are present in a subset of the plurality of listings which have received higher sales during the particular period of time than one or more other listings of the plurality of listings.

11. The method of claim 1, wherein a particular listing at a particular listing website server of the one or more first listing website servers describe a same inventory item as a corresponding listing at a corresponding listing website server of the one or more first listing website servers, the method further comprising;

using listing selection instructions of the translation server computer, identifying the particular listing as preferable over the corresponding listing;

wherein using the translation instructions of the translation server computer, translating the one or more first listings from the first language to the second language comprises translating the particular listing, but not translating the corresponding listing.

12. The method of claim 11, further comprising:

receiving, from the one or more first listing website servers, additional listing data of the one or more first listings;

wherein the additional listing data includes past sales data during a particular period of time;

wherein identifying the particular listing as preferable over the corresponding listing comprises determining that the particular listing received higher sales than the corresponding listing.

13. The method of claim 1 further comprising:

receiving an indication that a particular listing of either the one or more first listings or the one or more second listings has changed;

identifying related listings that comprise translations of the particular listing at other listing website servers;

sending updates to the other listing website servers for the related listings.

14. A system comprising:

a memory;

one or more processors coupled to the memory configured to:

receive a request from a client computing device to provide one or more translated listings of one or more first listings, to one or more second listing website servers, using one or more second languages;

wherein the one or more first listings are hosted at one or more first listing website servers and expressed in a first language and associated with the client computing device;

make one or more calls to an application programming interface of the one or more first listing website servers for the one or more first listings;

receive, from the one or more first listing website servers, the one or more first listings and store the one or more first listings in the memory;

wherein the translation server computer is coupled to a digitally stored n-gram data repository that comprises digitally stored records representing a plurality of sequences of words and corresponding translations for each of the plurality of sequences of words;

translate the one or more first listings from the first language into one or more translated listings that use the one or more second languages, by performing at least:

searching the digitally stored n-gram data repository for a first sequence of words extracted from the one or more first listings;

determining that the first sequence of words is not in the digitally stored n-gram data repository;

in response to determining the first sequence of words is not in the digitally stored n-gram data repository, repeating the following steps for any number of iterations until finding a particular sequence of words in the n-gram data repository:

identifying a new sequence of words that is different than any other searched sequence of words and has at most the same number of words as any other searched sequence of words;

searching the digitally stored n-gram data repository for the new sequence of words;

in response to determining the particular sequence of words is in the digitally stored n-gram data repository, identifying a corresponding translation for the particular sequence of words in the second language;

replacing the particular sequence of words in the first one or more listings with the corresponding translation;

generate one or more second listings from the one or more translated listings;

send the one or more second listings to the one or more second listing website servers.

15. The system of claim 14 wherein the one or more processors are further configured to:

receive a plurality of initial listings in the first language from a plurality of listing website servers;

receive a plurality of translations for the plurality of initial listings in the second language;

identify, in the plurality of listings, a repeated sequence of words that occurs in at least a threshold number of listings of the plurality of initial listings;

identify, in the plurality of translations for the plurality of initial listings, a repeated translation of the repeated sequence of words that occurs in the at least a threshold number of listings of the plurality of initial listings;

save the repeated sequence of words and the repeated translation of the repeated sequence of words in the digitally stored n-gram data repository as a new n-gram.

16. The system of claim 15, wherein the one or more processors are further configured to:

in response to saving the new n-gram in the digitally stored n-gram data repository, search the one or more first listings for repeated sequence of words from the new n-gram;

in response to identifying the repeated sequence of words in the one or more first listings, compare a translation of the repeated sequence of words in the one or more second listings with the repeated translation of the repeated sequences of words from the new n-gram;

in response to determining that the translation of the repeated sequence of words in the one or more second listings differs from the repeated translation of the repeated sequence of words from the new n-gram, generate one or more updated second listings;
send the one or more updated second listings to the one or more second listing website servers to replace the one or more second listings.

17. The system of claim 14, wherein the one or more processors are further configured to:
receive, from the one or more first listing website servers, additional listing data of the one or more first listings;
identify, from the additional listing data of the one or more first listings, a category corresponding to the one or more first listings;
translate one or more words or phrases of the one or more first listings from the first language to the one or more second languages using category specific translations stored in one or more category specific translation data repositories.

18. The system of claim 14, wherein the one or more processors are further configured to:
identify, for a particular listing website server of the one or more second listing website servers, a geographic region associated with the one or more second listing website servers;
translate, for the particular listing website server of the one or more second listing website servers, one or more words or phrases of the one or more first listings from the first language to the one or more second languages using region specific translations stored in one or more region specific translation data repositories.

19. The system of claim 14, wherein the one or more processors are further configured to:
identify a character limit for a particular field of a particular listing website server of the one or more second listing website servers;
determine that a number of characters in the particular field in the one or more translated listings exceeds the character limit for the particular field for the particular listing website server;
identify one or more words in the particular field in the one or more translated listings that may be removed from the particular field;
identify a different field for the one or more words; and
add the one or more words to the different field.

20. The system of claim 14, wherein the one or more processors are further configured to:
identify an input field in a particular website of the one or more second listing website servers for which a direct translation of the one or more first listings does not create data;
identify, in the one or more translated listings, one or more words that may be placed in the input field;
add the one or more words to the input field of a particular listing corresponding to the particular website.

21. The system of claim 14, wherein the one or more processors are further configured to:
translate the one or more first listings from the first language to the second language by identifying a preferable subset of the one or more first listings and translating only the preferable subset of the one or more first listings from the first language to the second language.

22. The system of claim 21, wherein the one or more processors are further configured to:
receive, from the one or more first listing website servers, additional listing data of the one or more first listings;
wherein the additional listing data of the one or more first listings comprises past sales data for a particular period of time for each listing of the one or more first listings;
wherein the one or more processors are further configured to identify the preferable subset of the one or more first listings by determining that the preferable subset of the one or more first listings have received higher sales during the particular period of time than one or more other listings of the one or more first listings.

23. The system of claim 21, wherein the one or more processors are further configured to: receive, from the one or more second listing website servers, a plurality of listings and past sales data for the plurality of listings during a particular period of time;
wherein the one or more processors are configured to identify the preferable subset of the one or more first listings by identifying one or more attributes in the preferable subset of the one or more first listings that are present in a subset of the plurality of listings which have received higher sales during the particular period of time than one or more other listings of the plurality of listings.

24. The system of claim 14:
wherein a particular listing at a particular listing website server of the one or more first listing website servers describe a same inventory item as a corresponding listing at a corresponding listing website server of the one or more first listing website servers;
wherein the one or more processors are further configured to:
identify the particular listing as preferable over the corresponding listing;
translate the one or more first listings from the first language to the second language by translating the particular listing, but not translating the corresponding listing.

25. The system of claim 24, wherein the one or more processors are further configured to:
receive, from the one or more first listing website servers, additional listing data of the one or more first listings;
wherein the additional listing data includes past sales data during a particular period of time;
wherein the one or more processors are further configured to identify the particular listing as preferable over the corresponding listing by determining that the particular listing received higher sales than the corresponding listing.

26. The system of claim 14, wherein the one or more processors are further configured to:
receive an indication that a particular listing of either the one or more first listings or the one or more second listings has changed;
identify related listings that comprise translations of the particular listing at other listing website servers;
send updates to the other listing website servers for the related listings.

* * * * *